(12) United States Patent
Tommy et al.

(10) Patent No.: US 9,760,089 B2
(45) Date of Patent: Sep. 12, 2017

(54) HYBRID REALITY BASED I-BOT NAVIGATION AND CONTROL

(71) Applicant: Tata Consultancy Services Limited, Mumbai (IN)

(72) Inventors: Robin Tommy, Trivandrum (IN); Arvind Verma, Trivandrum (IN); Aaditya Bhatia, Trivandrum (IN); Lokesh Deshmukh, Trivandrum (IN); Kaustav Chakraborty, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/078,700

(22) Filed: Mar. 23, 2016

(65) Prior Publication Data
US 2017/0168486 A1 Jun. 15, 2017

(30) Foreign Application Priority Data
Dec. 11, 2015 (IN) .......................... 4671/MUM/2015

(51) Int. Cl.
*G05D 1/00* (2006.01)
*G05D 1/02* (2006.01)
*G06N 99/00* (2010.01)

(52) U.S. Cl.
CPC ......... *G05D 1/0088* (2013.01); *G05D 1/0016* (2013.01); *G05D 1/0022* (2013.01); *G05D 1/021* (2013.01); *G06N 99/005* (2013.01)

(58) Field of Classification Search
CPC .. G05D 1/0088; G05D 1/0016; G05D 1/0022; G05D 1/021; G06N 99/00
See application file for complete search history.

(56) References Cited

U.S. PATENT DOCUMENTS

2016/0314621 A1* 10/2016 Hill .................... G02B 27/0172

FOREIGN PATENT DOCUMENTS

CN 104258539 1/2015

* cited by examiner

*Primary Examiner* — Michael D Lang
(74) *Attorney, Agent, or Firm* — Finnegan, Henderson, Farabow, Garrett & Dunner LLP

(57) ABSTRACT

A system and method for interaction, navigation and control of an autonomous robot. The system comprises of two electronic devices, which are compatible with all operating systems and also compatible with magnetic trigger of a virtual reality device. When a virtual reality application run, the application provides two scenes at the display. The interaction, navigation and control over the autonomous robot is based on movement triggered from the virtual reality device. On moving the head upwards and downwards the robot will move forward and backward respectively. The left and right movement of the platform would result in the brain infrastructure movement of the robot. The robot can interact with people in real time and it can also identify if the robot had already interacted with person. The robot can identify person on gender, age, voice and face recognition basis and it can also make calls, texts and clicking selfies etc.

10 Claims, 3 Drawing Sheets

HYBRID REALITY BASED I-BOT NAVIGATION AND CONTROL

PRIORITY CLAIM

This U.S. patent application claims priority under 35 U.S.C. §119 to India Application No. 4671/MUM/2015, filed on Dec. 11, 2015. The entire contents of the aforementioned application are incorporated herein by reference.

TECHNICAL FIELD

This disclosure relates generally to navigation and control of an autonomous robot, particularly systems and methods to facilitate a virtual reality based interaction, navigation and control of the autonomous robot

BACKGROUND

In todays' world an autonomous robot is a need for each sphere of the industry. An example of the autonomous robot is an i-BOT. The i-BOT is a powered social robot has a number of features distinguishing the i-BOT from most powered social robots. The i-BOT by rotating its two sets of powered wheels about each other can walk up and down stairs. The wheels can roll slightly at each step to compensate for a wide range of stair dimensions. When stair climbing without assistance, the user requires a sturdy handrail and a strong grip.

The existing autonomous robots require human effort for navigation and interaction with human and IoT devices. Navigation, control and Interaction of the autonomous robots with human and Internet of things (IoT) has become more prominent. The control and interaction of the autonomous robots from a virtual world is also a dream today due to the technological challenges.

Virtual reality (hereinafter read as VR) supplemented with augmented reality technology. The real world is the environment that an observer can see, feel, hear, taste, or smell using the observer's owns senses. The virtual world is defined as a generated environment stored in a storage medium or calculated using a processor.

There are number of situations in which it would be advantageous to superimpose computer-generated information on a scene being viewed by a human viewer. For example, a mechanic working on a complex piece of equipment would benefit by having the relevant portion of the maintenance manual displayed within his field of view while he is looking at the equipment. Display systems that provide this feature are often referred to as "Augmented Reality" systems. Typically, these systems utilize a head mounted display that allows the user's view of the real world to be enhanced or added to by "projecting" into it computer generated annotations or objects.

In today's world, there is an untapped need for autonomous robot which can navigate and can avoid obstacles without having manual interference. Interaction, control and communication with people and IoT devices are also equally important for autonomous robot. The current state-of-the-art systems for autonomous robot have many disadvantages, including: (a) virtual reality based control of the autonomous robot; (b) navigation of the autonomous robot based on a predefined path; (c) interaction and communication of autonomous robot with IoT devices; and (d) a remote control based face recognition, gender and age based human interaction by the autonomous robot.

OBJECTIVE

In accordance with the present disclosure, the primary objective is to provide a system and a method to facilitate a virtual reality based interaction, navigation and control of the autonomous robot.

Another objective of the disclosure is to provide a system and a method for navigation of the autonomous robot based on a predefined path.

Another objective of the invention is to provide a system and a method for interaction and communication of autonomous robot with IoT based devices.

Another objective of the invention is to provide a system and a method for a remote control based face recognition, gender, age and emotion based human interaction by the autonomous robot.

Other objectives and advantages of the present invention will be more apparent from the following description when read in conjunction with the accompanying figures, which are not intended to limit the scope of the present disclosure.

SUMMARY

Embodiments of the present disclosure present technological improvements as solutions to one or more of the above-mentioned technical problems recognized by the inventors in conventional systems. For example, in one embodiment, a system for a virtual reality based Interaction, navigation and control of the autonomous robot. The system includes an i-BOT which is controlled by a mobile electronic device. It would be appreciated that the i-BOT can be used as autonomous robot. The system comprises of two electronic devices, which are compatible with all operating system, one is a mobile electronic device and other one is handheld electronic device. The mobile electronic device is mounted on the autonomous robot. The mobile electronic device acts as a controller of the i-BOT. The controller enables controlling the motion of i-BOT, giving Instruction and also monitoring IoT based devices in the surroundings of the i-BOT.

The handheld electronic device is also compatible with virtuality reality based platform. The handheld electronic device is having a virtual reality application. On running the application and the handheld electronic device ensures interaction, navigation and control of autonomous robot from virtual environment. The system ensures setting reminders, human detection and activation, age and gender identification. The system also have features like clicking photos, making calls, sending texts, etc.

In another embodiment, a computer implemented method for interaction between an autonomous robot and human, the method comprises of receiving a real time image feed from the autonomous robot on a virtual reality application installed in a handheld electronic device, visualizing a stereoscopic image with wide field view, of the received real time image using a virtual reality device, in a virtual environment, determining one or more human is present in the received Image using cognitive intelligence of the autonomous robot, learning one or more characteristics of the determined one or more human by social Intelligence of the autonomous robot and communicating accordingly with the determined one or more human based on learned the one or more characteristics through a mobile electronic device.

In yet another embodiment, a computer readable medium storing Instructions for executing a method performed by a computer processor, the method following the steps of receiving a real time image feed from the autonomous robot on a virtual reality application Installed in a handheld electronic device, visualizing a stereoscopic image with wide field view, of the received real time Image using a virtual reality device, in a virtual environment, determining one or more human is present in the received Image using cognitive intelligence of the autonomous robot, learning one or more characteristics of the determined one or more human by social Intelligence of the autonomous robot and communicating accordingly with the determined one or more human based on learned the one or more characteristics through a mobile electronic device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
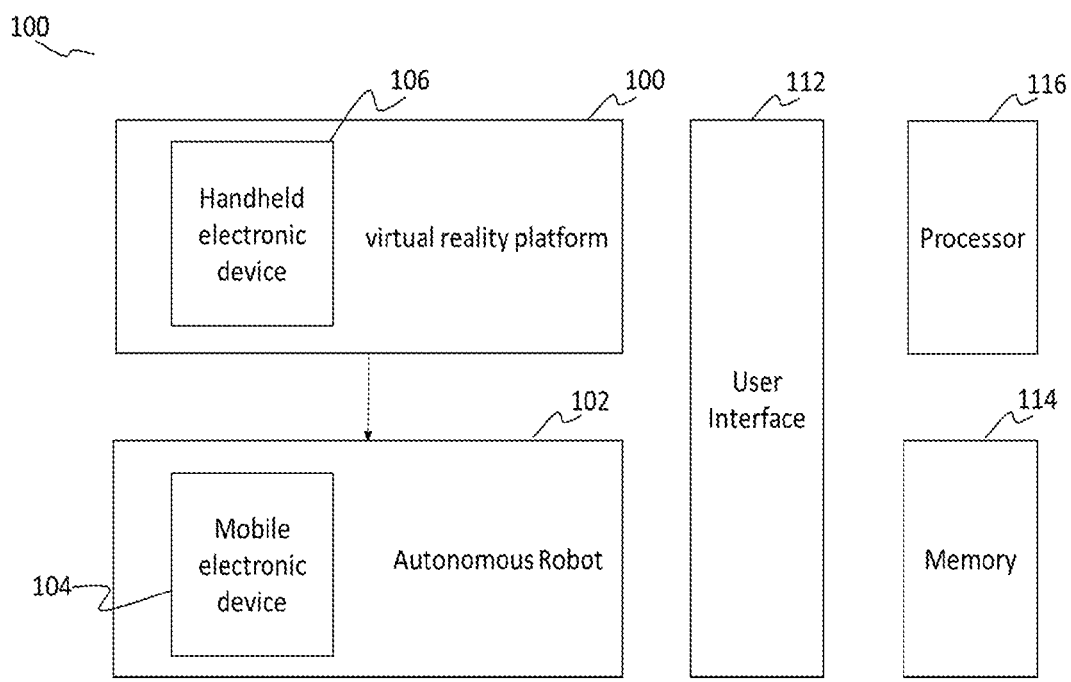
FIG. 1 illustrates an exemplary network implementation of a system for virtual reality based navigation, control and interaction of the autonomous robot.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to systems and methods for interaction navigation and control of an autonomous robot. The system includes an autonomous robot, two electronic devices which are compatible with all operating systems, a mobile electronic device and a handheld electronic device. The handheld electronic device is having magnetometer functionality. Further, the system includes a virtual reality device (Google Cardboard), a memory, and a processor in communication with the memory.

In the preferred embodiment, further the system comprises of a plurality of sensors in the autonomous robot for communicating with the autonomous robot in a predefined range. It should be appreciated that the predefined range is equivalent to the communication range of the plurality of sensors. The system is useful for the general, handicapped and elderly users. The system provides a platform to the user to control the autonomous robot and interact with human and IoT based devices from a virtual environment. The upward and downward movement of the Google Cardboard will move the autonomous robot forward and backward respectively. On left and right movement of the Google Cardboard would result in servo rotation of the autonomous robot. The system also provides a virtual reality environment in which the user can control the navigation, ultrasonic detection and obstacle avoidance of the autonomous robot.

In the preferred embodiment, the mobile electronic device acts as a controller of the autonomous robot. The system provides a remote control which is operated by mobile electronic device. The system can be extended to provide a full hand-free interaction that can interact with humans and the plurality of IoT based devices like TV, lighting system of the room etc., which are in surrounding to autonomous robot. The system determines the presence of an individual or a crowd in the surrounding. The system learns characteristics such as age and gender of an individual using cognitive intelligence of the autonomous robot. The system also learns whether it had communicated with the individual or not. If yes, the system may start communication in accordance to previous communication using the social intelligence of the autonomous robot. If the system had not communicated previously, the system may start communication as per emotions of the individual using predictive intelligence of the autonomous robot. The system also provides a physical assistance for elderly people and the children.

Referring now to FIG. 1, a network implementation of a system 100 for interaction, navigation and control of an autonomous robot 102. The system 100 includes a mobile electronic device 104, a handheld electronic device 106, an virtual reality application 108 installed in the handheld electronic device 106, a virtual reality device 110, a user interface 112, a memory 114, and a processor 116 in communication with the memory 114.

In the preferred embodiment, the mobile electronic device 104 mounted on the autonomous robot 102 and the handheld electronic device 106 having the virtual reality application 108. The mobile electronic device 104 and the handheld electronic device 106 are configured to work with all operating systems. The virtual reality application 108 is compatible with all operating system such as android, iOS and windows. The handheld electronic device 106 is configured to place within the virtual reality device 110. The virtual reality device 110 to visualize a stereoscopic image with wide field view, in a virtual environment. In this case a Google cardboard may be used as a virtual reality device. The Google cardboard can be mounted on the head.

The mobile electronic device 104 mounted on the autonomous robot 102 acts as a remote controller of the autonomous robot 102. The mobile electronic device 104 is incorporated with a voice controlled interface. When the autonomous robot 102 determines one or more human, the mobile electronic device 104 initialize and start interaction with determined human. The mobile electronic device 104 save the people whom the robot is interacted. The mobile electronic device 104 can provide assistance to the autonomous robot 102 in making reminders, calls, texts and clicking selfies. The mobile electronic device 104 also have a face recognition to recognize people whom the robot has been already Interacted with. A user interface 112 through which the user is able to see the live video of the surroundings and the processor 116 provides controlling functions of the system 100.

In the preferred embodiment, the plurality of IoT based devices in the surrounding of the autonomous robot 102, are distinct to each other IoT based devices. The system 100 allows the user to control the plurality of IoT devices by moving head upwards and downwards. On moving head in right direction the system 100 provides instructions on display of the user interface 112 to guide the user about the switching of the IoT based devices are in surrounding to the autonomous robot 102.

In the preferred embodiment, the autonomous robot 102 comprises of a plurality of sensors to establish interaction with one or more human and a plurality of IoT based devices. The plurality of sensors of the autonomous robot include IR sensor, WiFi, Bluetooth, temperature sensor, magnetometer sensor, accelerometer sensor and gyroscope sensor. The autonomous robot 102 further comprises of a cognitive intelligence, a social intelligence and a predictive Intelligence. The cognitive intelligence of the autonomous robot 102 involves its ability to reason, plan, learn quickly and learn from experience. The social intelligence of the autonomous robot 102 determines characteristics such as age, gender and emotion of an individual or the crowd. According to the age and gender of an individual the autonomous robot 102 may start communication. The autonomous robot 102 stores the characteristic and the communication has been established with an Individual. The autonomous robot 102 is configured to recall the previous communication when the Individual interacts with the autonomous robot 102 again, and can also start from last communication. The autonomous robot can move as predefined path.

Figure 2A:
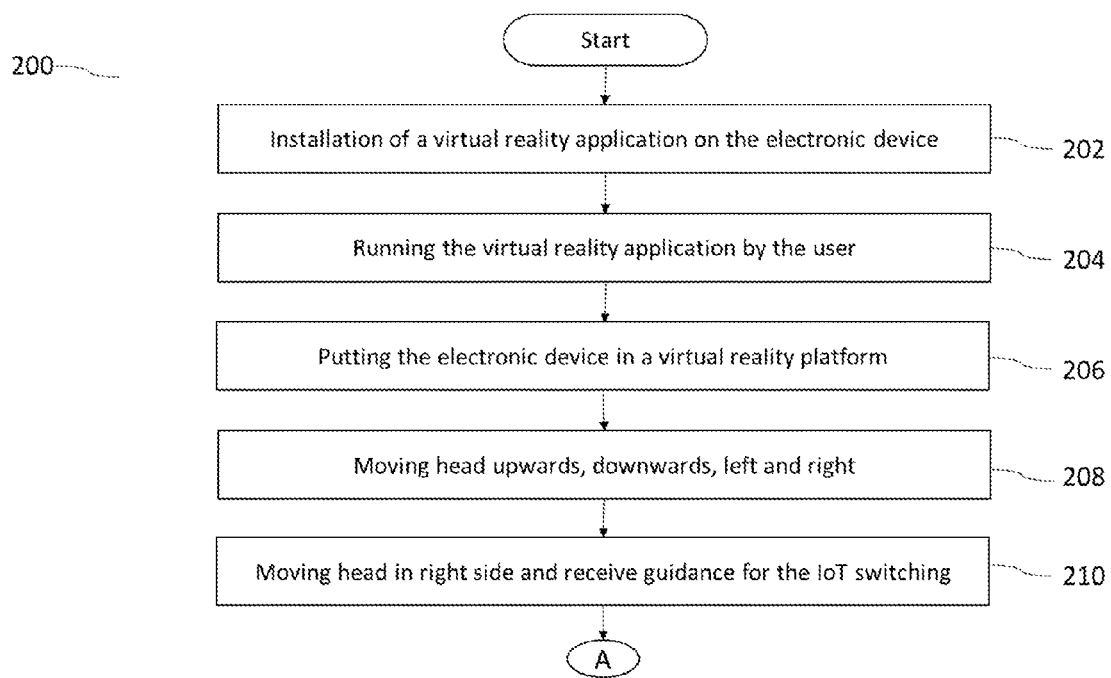
FIGS. 2a and 2b illustrates a flow diagram showing a method for virtual reality based navigation, control and interaction of the autonomous robot.
Figure 2B:
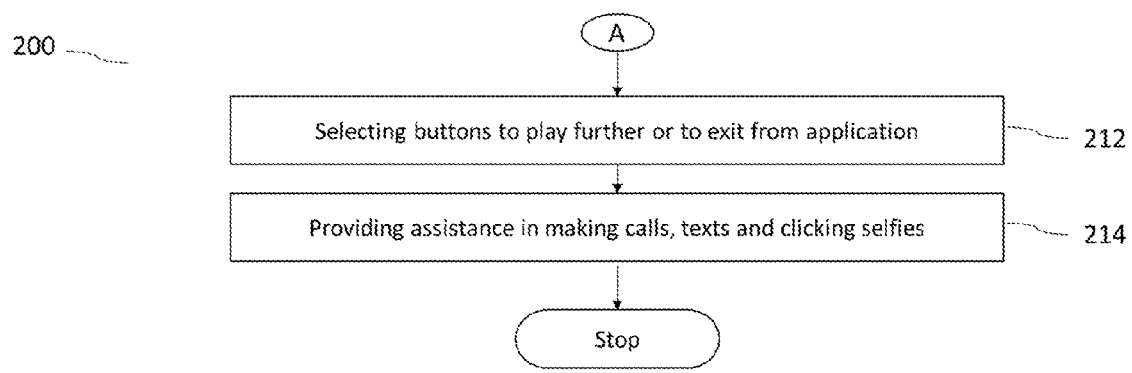

Referring now to FIGS. 2a and 2b illustrates a method 200 for interaction, navigation and control of the autonomous robot 102. At step 202, the user may install a virtual reality application 108 on the handheld electronic device 106. At step 204, when the user runs the virtual reality application 108 on the handheld electronic device 106, the application 108 splits the screen of the handheld electronic device 106 into two halves. At step 206, the user put the handheld electronic device 106 in the Google cardboard/virtual reality device 110 and wear it on head. The virtual reality application 108 consists of two scenes. First scene is a simple menu screen providing two options to the user to play and to exit from the application. The second scene which has a stereoscopic image with wide field view is a virtual environment. Initially the user is able to see a real time image feed from the autonomous robot captured by the mobile electronic device camera.

In the preferred embodiment, at step 208, when user moves his head upwards and downwards the autonomous robot 102 is moving forward and backward respectively. On moving head left and right the result will be servo rotation of the autonomous robot 102. The movement of head can control the plurality of IoT devices, in the surrounding of the autonomous robot 102. The user can select options by pulling the any triggering object from the virtual reality environment such as a magnetic trigger on the left side of the cardboard to select control of the autonomous robot or to enable the plurality of IoT devices in the surrounding of the autonomous robot 102. At step 210, on moving head right side the user may get some guidance and an image on the display user interface 112 to describe the switching on and off to the plurality of IoT devices in the surrounding to the autonomous robot 102.

In the preferred embodiment, at step 212, the user can play further or exit from the application 108, based on the selection of buttons from menu, and enter into remote control mode. In the remote control mode the mobile electronic device 104 acts as a brain and may interact, navigate and control the autonomous robot 102. In the remote control mode the user has voice recognition application, face recognition application and control options as well as button clicking options. At step 214, a mobile electronic device 104 mounted on the top of the autonomous robot 102 having voice controlled interface provides assistance in making reminders, calls, texts, clicking selfies etc. whether the system is in a virtual environment control mode or in the remote control mode.

In an example of the disclosure, the autonomous robot consists of high torque motors connected to motor drivers. The motor drivers are guided by arduino instructions. The ultrasonic sensors of the autonomous robot helps in navigation to detect and avoid obstacles. The arduino receives Bluetooth instructions from the mobile electronic device mounted on the autonomous robot. The mobile electronic device is in connection with servo motors of the autonomous robot, which moves in the direction in which the obstacle is detected. This enables the autonomous robot to determine if it has encountered a human or not.

Although implementations of system and method for integrating data from plurality of sources and to present a comprehensive view to the consuming applications, it is to be understood that the specific features and methods are disclosed as examples of implementations for integrating data from plurality of sources and to present a comprehensive view to the consuming applications.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system comprising:
    an input/output interface;
    a memory with plurality of instructions;
    a processor in communication with the memory;
    an autonomous robot electronically coupled with the processor;
    a mobile electronic device mounted on the autonomous robot and electronically coupled to the processor to initialize an interaction with one or more humans and one or more IoT based devices in a predefined range of the autonomous robot;
    a virtual reality device electronically coupled to the processor to visualize a stereoscopic image in a virtual environment;
    a handheld electronic device electronically coupled to the processor, placed in the virtual reality device, to execute a plurality of actions using the autonomous robot from the virtual environment, wherein the plurality of actions comprise:
        determining the presence of the one or more humans in the received image using cognitive intelligence of the autonomous robot;
        learning one or more characteristics of the determined one or more human using social intelligence of the autonomous robot; and
        communicating with the determined one or more humans based on the learned one or more characteristics using a mobile electronic device.

2. The system claimed in claim 1, wherein the autonomous robot communicates with one or more human according to the age, gender and emotions of the human using the mobile electronic device.

3. The system claimed in claim 1, wherein the mobile electronic device and the handheld electronic device are compatible with android, iOS, and windows.

4. The system claimed in claim 1, wherein the plurality of actions executed by the handheld electronic device from a virtual environment includes interaction, navigation and control of the autonomous robot.

5. The system claimed in claim 1, wherein the autonomous robot comprises a plurality of sensors to establish interaction with one or more human and the one or more IoT based devices, the plurality of sensors include IR sensor, WiFi, Bluetooth, temperature sensor, magnetometer sensor, accelerometer sensor and gyroscope sensor.

6. The system claimed in claim 1, wherein the mobile electronic device acts as a remote controller of the autonomous robot.

7. The system claimed in claim 1, wherein the mobile electronic device configured to provide assistance to autonomous robot in making calls, sending texts, taking selfies.

8. The system claimed in claim 1, the mobile electronic device configured to store details whom the autonomous robot is interacted with.

9. A computer implemented method for providing interaction between an autonomous robot and one or more human, the method comprising:
    receiving a real time image feed from the autonomous robot on a virtual reality application installed in a handheld electronic device;
    visualizing a stereoscopic image of the received real time image using a virtual reality device, in a virtual environment;
    determining the presence of one or more human in the received image using cognitive intelligence of the autonomous robot;
    learning one or more characteristics of the determined one or more human using social intelligence of the autonomous robot,
    communicating with the determined one or more human based on the learned one or more characteristics using a mobile electronic device, wherein the one or more characteristics are saved such that a new communication is started based on a previous communication using the social intelligence of the autonomous robot.

10. A computer implemented method for providing interaction between an autonomous robot and one or more IoT based devices, the method comprising:
    receiving a real time image feed from the autonomous robot on a virtual reality application installed in a handheld electronic device;
    visualizing a stereoscopic image of the received real time image using a virtual reality device, in a virtual environment;
    determining the presence of one or more IoT based devices in the received image using cognitive intelligence of the autonomous robot;
    learning one or more characteristics of the determined one or more IoT based devices using cognitive intelligence of the autonomous robot;
    interacting with the determined one or more IoT based devices based on the learned one or more characteristics through a mobile electronic device, wherein the one or more characteristics are saved such that a new interaction is started based on a previous interaction using a social intelligence of the autonomous robot; and
    executing at least one action over the one or more IoT based devices.

* * * * *